Aug. 23, 1966   A. M. BIGGAR ET AL   3,268,184
TEMPERATURE ACTUATED INFLATION DEVICE
Filed May 6, 1964   2 Sheets-Sheet 1
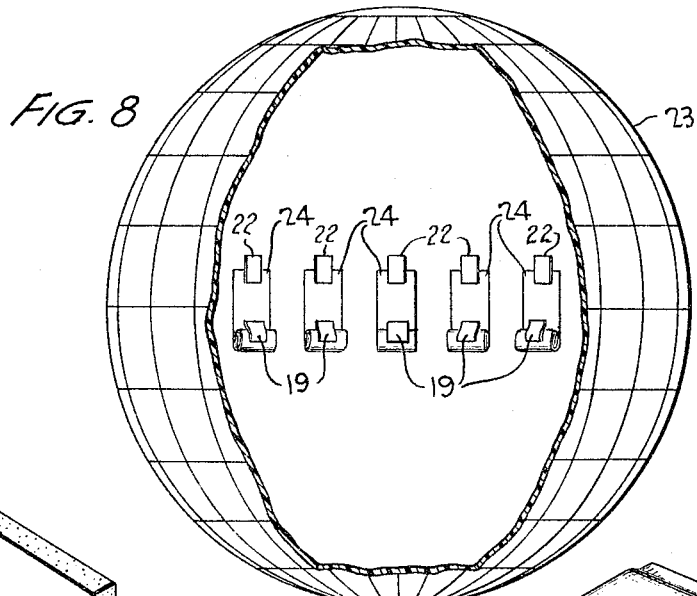
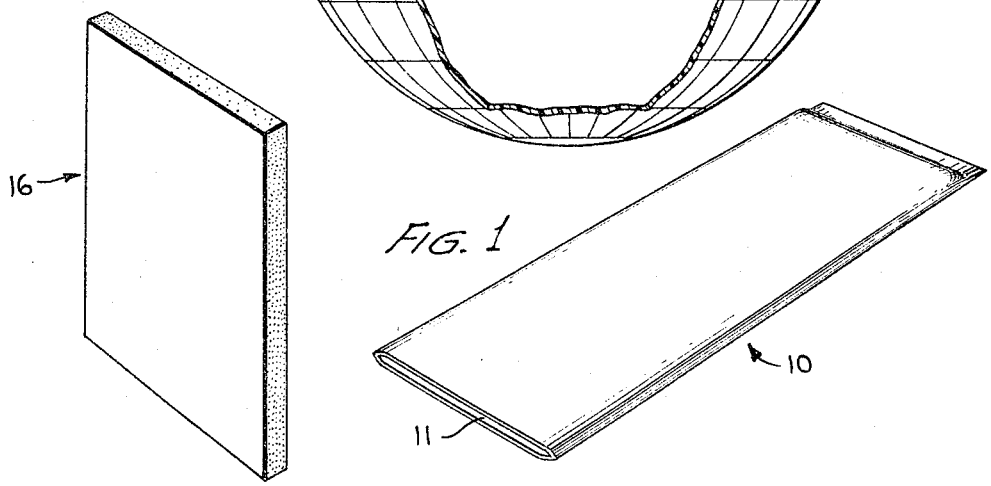
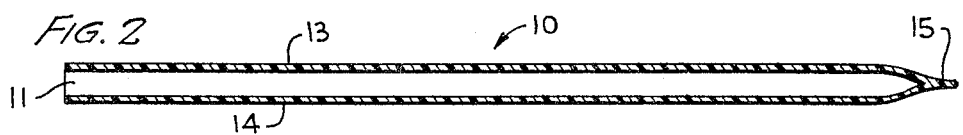
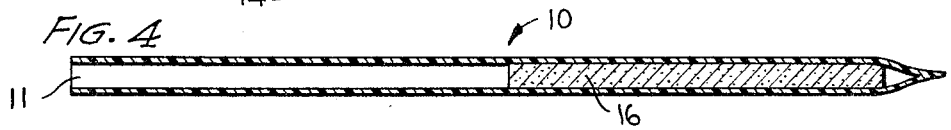
INVENTORS,
ALLAN M. BIGGAR
KARL F. PLITT
JOHN M. THOLE

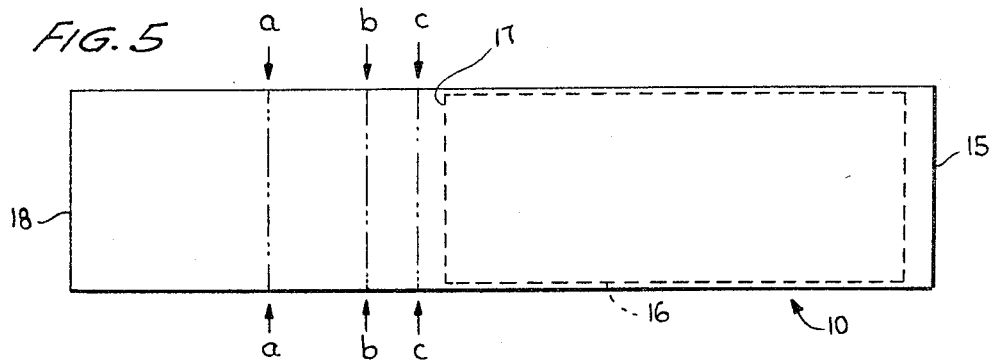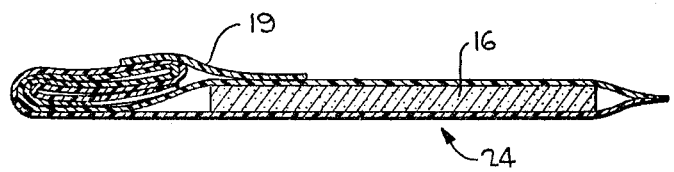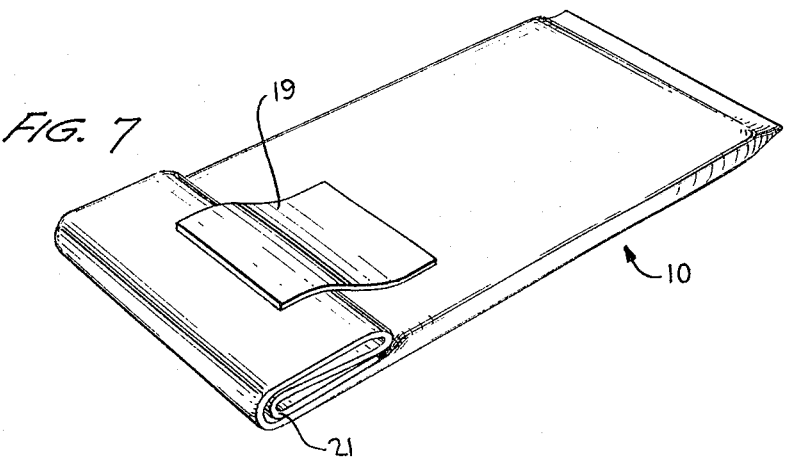

United States Patent Office 3,268,184
Patented August 23, 1966

3,268,184
TEMPERATURE ACTUATED INFLATION DEVICE
Allan M. Biggar, Alexandria, Va., and Karl F. Plitt, Kensington, and John M. Thole, Silver Spring, Md., assignors to the United States of America as represented by the Secretary of the Army
Filed May 6, 1964, Ser. No. 365,539
5 Claims. (Cl. 244—1)

The invention described herein may be manufactured and used by or for the Government of the United States of America for governmental purposes without the payment to me of any royalty thereon.

This invention relates to inflatable members, and more particularly to a novel method and apparatus of inflating large balloons for experiments in outer space, such as the Echo communication satellites.

The use of large pressurized balloons for experiments in outer space is becoming increasingly important. Such balloons offer numerous possibilities for use in communication relay stations, weather forecasting fields, and other studies relating to outer space. To fulfill these needs the balloon must be a flexible, lightweight space vehicle which can be carried aloft in a compact package and, at a preselected distance, erected to assume a particular configuration. Although the erection can be readily accomplished by the use of an inflating medium, in view of the likelihood of puncture of the skin material of the space vehicle or balloon by space debris—for example micrometeorites—the internal pressure of the inflating medium cannot be relied upon to maintain the desired vehicular configuration.

Inflatable self-supporting space vehicles have been designed for these purposes. An example is the patent for a Self Supporting Space Vehicle issued to William J. O'Sullivan, Jr., Patent Number 2,996,212. The space vehicle described in this patent comprises, briefly, an envelope formed of a thin laminated material having a plastic film and a metallic film bonded to at least one side of it. Means are provided for developing an interal pressure within the envelope sufficient to stress the laminated material beyond its yield point but less than the ultimate tensile strength of the material, in order to establish a permanent set in the vehicle's skin. Once the vehicle's skin has taken a permanent set in its inflated position, the inflating gas is no longer necessary to maintain the structural shape.

One common method of inflating self supporting space vehicles described in the O'Sullivan patent is to use a subliming material. Such a technique is described in the patent to Vincent E. Lally, Patent Number 3,109,607, entitled Inflation of Balloon. In this technique, the inflating means includes a subliming material which has the characteristic of being transformed from a solid to a gas when the pressure exerted on it is reduced. Before the inflation of the balloon, the balloon and subliming material are maintained under pressure. When the pressure is released, the subliming material is transformed from a solid to a gas, and the resulting gas is used to inflate the balloon.

Proper inflation of a self supporting space vehicle of the type described in the O'Sullivan patent, as well as other large inflatable space vehicles, require a relatively high internal pressure. This pressure must be applied gradually to avoid rupture. While the use of a subliming material such as described in the Lally patent has obvious advantages in that it does not require bulky, heavy inflation apparatus and is almost foolproof in operation, it tends to inflate the vehicle at too rapid a rate. When the balloon is ejected in outer space, the pressure is immediately released, and the subliming material sublimes.

As the material sublimes in the confined space of the balloon a rather high pressure develops accelerating the skin of the balloon rapidly outward. As the balloon expands at a high velocity, the momentum of the expanding walls is correspondingly high, and this high momentum tends to cause the walls to pass their yield point destroying the balloon envelope.

It is an object of this invention to provide for the controlled inflation of a space vehicular balloon.

Another object of this invention is to provide a highly reliable, simple, inexpensive method and device for controlling the release of a self supporting space vehicle pressurizing agent.

Since the balloon fabric is very fragile it is important, and also an object of this invention, that the control device be flexible, pliable, of minimum thickness, and present no sharp corners or concentrated mass that might puncture the fabric during folding or deployment.

These and other objects of the invention are accomplished by placing the inflating gas within a container inside the balloon, providing the container with a controlled release and deploying the balloon in two stages. The container release is so constructed as to release the inflating gas after the balloon has been initially deployed by the residual gas which inevitably remains after the balloon has been folded and packed. More specifically, a sublimating material is placed within a bag of polyethylene or other soft plastic. This bag is then sealed with a temperature sensitive adhesive, and the sealed bag, or a plurality of similar sealed bags, are then placed within the space balloon. After the balloon has been ejected from its capsule in outer space, and has partially deployed due to the residual gas within it, the temperature of the adhesive sealed plastic bags is gradually raised by the sun's radiant energy falling upon the balloon. When the adhesive temperature reaches a predetermined point (allowing sufficient time for the balloon to partially deploy) the adhesive loses its holding power and allows the gas from the sublimating material within the bag to escape and fully extend the balloon.

The specific nature of the invention, as well as other objects, uses and advantages thereof, will clearly appear from the following description and from the accompanying drawings, in which:

FIG. 1 is a perspective view of a plastic bag of the type useful in the practice of this invention.

FIG. 2 is a sectional view of a plastic bag similar to that shown in FIG. 1.

FIG. 3 represents a filter paper which has been impregnated with a sublimating material.

FIG. 4 is a sectional view of a plastic bag with the sublimating material in place.

FIG. 5 is a plan view of the plastic bag of this invention illustrating one preferred method of folding the bag to seal it.

FIG. 6 is a sectional view of the temperature actuated device of this invention, sealed ready for placement within a balloon.

FIG. 7 is a perspective view of the temperature actuated inflation device shown in FIG. 6.

FIG. 8 illustrates one scheme of arrangement of the temperature actuated inflation devices of this invention within a balloon.

Referring to FIG. 1, there is shown a plastic bag which may be used in the practice of this invention. Since the balloon fabric is very fragile in the balloons used for space research such as those disclosed in the O'Sullivan patent supra, it is important that the bag 10 be flexible, pliable, of a minimum thickness, and present no sharp corners or concentrated mass that might puncture the fabric during folding or deployment. Suitable plastic bags may be made of polyethylene polyester, polyvinylidene chloride, polypropylene, a polyester-polyethylene laminate, or other suitable plastic film. Persons skilled in the art will recognize that these bags are similar to the type commonly used to package vegetables in supermarkets. The bag 10 has an opening 11 at one end, and the remaining three sides are sealed. FIG. 2 is a sectional view of the bag shown in FIG. 1, showing that it is made up of two pieces of plastic film 13 and 14 sealed on three sides as is illustrated at 15. As is known in the art, the seals such as is illustrated at 15 may be made in many types of plastic by the suitable application of heat and pressure.

FIG. 3 shows a source of pressurizing gas. It may be comprised of a flat porous sheet such as filter paper, or a suitable cloth fabric, impregnated with acetamide, or any other suitable sublimating pressurizing agent. The sheet 16 can be prepared by saturating the porous fabric with molten acetamide, and then allowing the sheet to cool. The sheet is then cut into pieces of suitable size for placement within the bag 10.

FIG. 4 shows a plastic bag 10, of the type described in FIGS. 1 and 2, with pressurizing agent 16 inside. The bag 10 is then sealed with a temperature sensitive adhesive and placed within the balloon.

FIGS. 5 and 6 illustrate a preferred method of sealing the bag 10 with a temperature sensitive adhesive. FIG. 5 shows the bag 10 with the pressurized agent 16 inside, extending to the dotted line 17. To seal the bag 10, the open end 18 is first folded along the dotted line $a$, which is midway between the end 18 and the pressurizing agent 16. The bag is again folded in the same direction along the line $b$ and then again in the same direction along the line $c$.

The folded bag is shown in cross-section in FIG. 6. Only the first two folds along lines A and B are shown for clarity of illustration. Obviously, there is almost an endless variety of possible folds which will seal the bag 10. In order to maintain the bag 10 in a sealed position, and provide the controlled release characteristic, a temperature sensitive adhesive 19 is used to maintain the opening 11 in a sealed position by keeping the folds 21 from unraveling.

A temperature sensitive adhesive 19, useful in the practice of this invention, is fully described in our co-pending application Serial No. 403,956, filed October 14, 1964, assigned to the same assignee as the present invention. Briefly, this temperature sensitive adhesive is made up of technical grade eicosane 50 parts by weight, polyethylene-vinylacetate copolymer 30 parts by weight, coumarone-idene resin 20 parts by weight, powdered graphite 2 parts by weight, and powdered glass 2 parts by weight. The technical eicosane provides the basic material with a proper melting point. The polyethylene-vinylacetate provides the necessary cohesive strength, and the coumarone-indene resin the necessary adhesiveness. The graphite and powdered glass are used to enhance radiation adsorption. For convenience in handling, this adhesive may be used as an impregnant in a porous material such as woven glass tape. Reference numeral 19 actually indicates a tape type adhesive in the preferred embodiments of FIGS. 6 and 7.

A suitable number (several hundred) of the sealed temperature actuated inflation devices shown in FIGS. 6 and 7 are affixed to the inner surface of the balloon envelope with the adhesive joints 19 facing the center of the balloon, as it is shown in FIG. 8. A small piece of double-sided adhesive such as 22 may be used to attach each inflation device to the inner surface of the balloon 23. The balloon is then folded and placed within its capsule. Upon deployment of the balloon 23 from the capsule it inflates as a result of the low residual gas pressure. The higher pressures within the individual inflating devices 24 cause the plastic bag 10 to distend and places the adhesive joints under load. When sunlight strikes the main balloon skin the interior of the balloon becomes a "black-body" for infra-red radiant energy. This energy is absorbed by the adhesive joints 19, causing them to be heated at varying rate depending upon their location on the balloon skin. As the joints reach their release temperature they lose adhesiveness and allow the pressure within the bags 10 to open the bags and escape into the balloon. The pressure of the inflating medium then places the necessary pressure on the skin of the balloon in the required gradual manner.

It will be apparent that the emodiments shown are only exemplary and that various modifications can be made in construction and arrangement within the scope of the invention as defined in the appended claims.

We claim as our invention:

1. A temperature activated inflation device comprising:
   (a) a thin, pliable plastic bag,
   (b) a sublimating pressurizing agent within said bag,
   (c) said bag being sealed by the open end of said bag being folded over upon itself, and
   (d) temperaure sensitive adhesive tape means for securing said fold to said bag,
   (e) whereby when said tape means is heated to a predetermined temperature, said tape loses its adhesiveness and said fold is released allowing said agent to escape.

2. The device according to claim 1 further comprising a sheet of porous material in said bag impregnated with said agent.

3. A system for controllably inflating a self-supporting space vehicle comprising:
   (a) a plurality of containers affixed to the inner surface of the skin of said vehicle,
   (b) means in said containers for producing a pressurizing gas for inflating said vehicle in space,
   (c) means for controlling the release of said gas from said containers including a temperature sensitive adhesive for sealing said containers,
   (d) said adhesive losing its adhesiveness as the interior of said vehicle becomes heated due to the energy from the sun being absorbed by said skin when said vehicle is in space, whereby
   (e) the pressure of said gas within said containers is allowed to open said containers and inflate said vehicle.

4. The inflating system according to claim 3 wherein:
   (a) said containers comprise thin, pliable plastic bags,
   (b) said gas producing means comprises a sublimating agent,
   (c) each of said bags being sealed by the open end thereof being folded over upon itself, and
   (d) said temperature sensitive adhesive keeping said folds from unraveling.

5. The inflating system according to claim 4 wherein said gas producing means further comprises a sheer of porous material impregnated with said sublimating agent.

References Cited by the Examiner

UNITED STATES PATENTS

| | | | |
|---|---|---|---|
| 2,857,971 | 10/1958 | Ferris | 169—26 |
| 3,109,607 | 11/1963 | Lally | 244—1 |

FOREIGN PATENTS

| | | |
|---|---|---|
| 364,792 | 1/1932 | Great Britain. |

FERGUS S. MIDDLETON, *Primary Examiner.*